(12) United States Patent
Guerin

(10) Patent No.: US 12,098,578 B2
(45) Date of Patent: Sep. 24, 2024

(54) DOOR LEAF HANDLE DEVICE, IN PARTICULAR FOR VEHICLE

(71) Applicant: U-Shin Italia S.p.A., Pianezza (IT)

(72) Inventor: Anthony Guerin, Pianezza (IT)

(73) Assignee: U-SHIN ITALIA S.P.A., Pianezza (IT)

( * ) Notice: Subject to any disclaimer, the term of this patent is extended or adjusted under 35 U.S.C. 154(b) by 534 days.

(21) Appl. No.: 16/951,588

(22) Filed: Nov. 18, 2020

(65) Prior Publication Data

US 2021/0071449 A1    Mar. 11, 2021

Related U.S. Application Data

(63) Continuation of application No. PCT/EP2019/063513, filed on May 24, 2019.

(30) Foreign Application Priority Data

May 25, 2018 (FR) .................................. 18/54459

(51) Int. Cl.
| | |
|---|---|
| E05B 85/10 | (2014.01) |
| E05B 17/10 | (2006.01) |
| E05B 79/06 | (2014.01) |
| E05B 79/12 | (2014.01) |
| E05B 81/76 | (2014.01) |

(52) U.S. Cl.
CPC ............ *E05B 85/103* (2013.01); *E05B 17/10* (2013.01); *E05B 79/06* (2013.01); *E05B 79/12* (2013.01); *E05B 81/77* (2013.01)

(58) Field of Classification Search
CPC .......... E05B 79/06; E05B 81/77; E05B 85/10; E05B 85/103
See application file for complete search history.

(56) References Cited

U.S. PATENT DOCUMENTS

| | | | | |
|---|---|---|---|---|
| 4,653,143 | A * | 3/1987 | Ketelhut | E05B 85/18 16/443 |
| 5,706,554 | A * | 1/1998 | Ruckert | E05B 79/06 292/336.3 |
| 6,406,075 | B1 * | 6/2002 | Rice | E05B 85/18 70/210 |
| 6,666,496 | B2 * | 12/2003 | Rettig | E05B 79/06 292/336.3 |

(Continued)

FOREIGN PATENT DOCUMENTS

| | | | | |
|---|---|---|---|---|
| DE | | 10020172 A1 * | 1/2001 | ............ E05B 77/34 |
| DE | | 102005049884 | 4/2007 | |

(Continued)

OTHER PUBLICATIONS

International Search Report for International Application PCT/EP2019/063513, mailed Aug. 16, 2019.

*Primary Examiner* — Carlos Lugo
(74) *Attorney, Agent, or Firm* — Burris Law, PLLC

(57) ABSTRACT

A handle device for an opening panel handle, in particular for a motor vehicle, includes a handle support mounted on the inside of the opening panel and a rim mounted on the outside of the opening panel, the rim being attached to the handle support from a recess of the opening panel. The handle support includes the handle and the rim extends through a guide towards the inside of the opening panel, which includes an opening to allow a hand to access the handle.

10 Claims, 8 Drawing Sheets

(56) References Cited

U.S. PATENT DOCUMENTS

| | | | | |
|---|---|---|---|---|
| 6,698,262 | B2* | 3/2004 | Wittwer | E05B 77/34 |
| | | | | 292/DIG. 31 |
| 7,283,034 | B2* | 10/2007 | Nakamura | E05B 81/78 |
| | | | | 340/5.2 |
| 8,282,142 | B2* | 10/2012 | Fannon | E05B 79/12 |
| | | | | 292/336.3 |
| 9,458,649 | B2* | 10/2016 | Fujiwara | E05B 81/56 |
| 11,203,887 | B2* | 12/2021 | Wilke | H01H 3/122 |
| 11,286,695 | B2* | 3/2022 | Moriwaki | E05B 79/22 |
| 11,396,764 | B2 | 7/2022 | Blount et al. | |
| 2005/0057050 | A1 | 3/2005 | Saitoh et al. | |
| 2012/0119524 | A1* | 5/2012 | Bingle | E05B 81/78 |
| | | | | 292/336.3 |
| 2019/0106912 | A1* | 4/2019 | Lennhoff | E05B 85/18 |
| 2021/0062558 | A1* | 3/2021 | Beck | E05B 81/90 |

FOREIGN PATENT DOCUMENTS

| | | | | |
|---|---|---|---|---|
| DE | 102013102106 A1 | * | 9/2014 | ............ E05B 79/06 |
| DE | 102006029570 B4 | * | 11/2015 | ............ E05B 77/36 |
| EP | 0417565 | | 3/1991 | |
| EP | 999323 A2 | * | 5/2000 | ............ E05B 77/34 |
| EP | 1235190 | | 8/2002 | |
| EP | 1932984 A2 | * | 6/2008 | ............ E05B 81/76 |
| FR | 2826998 | | 1/2003 | |
| FR | 3034802 A1 | * | 10/2016 | |
| JP | H01182478 | | 7/1989 | |
| JP | 2015231770 A | * | 12/2015 | |
| KR | 100931160 B1 | * | 12/2009 | |
| WO | WO-2013111615 A1 | * | 8/2013 | ............ E05B 39/00 |
| WO | 2014049026 | | 4/2014 | |
| WO | 2015148788 | | 10/2015 | |

\* cited by examiner

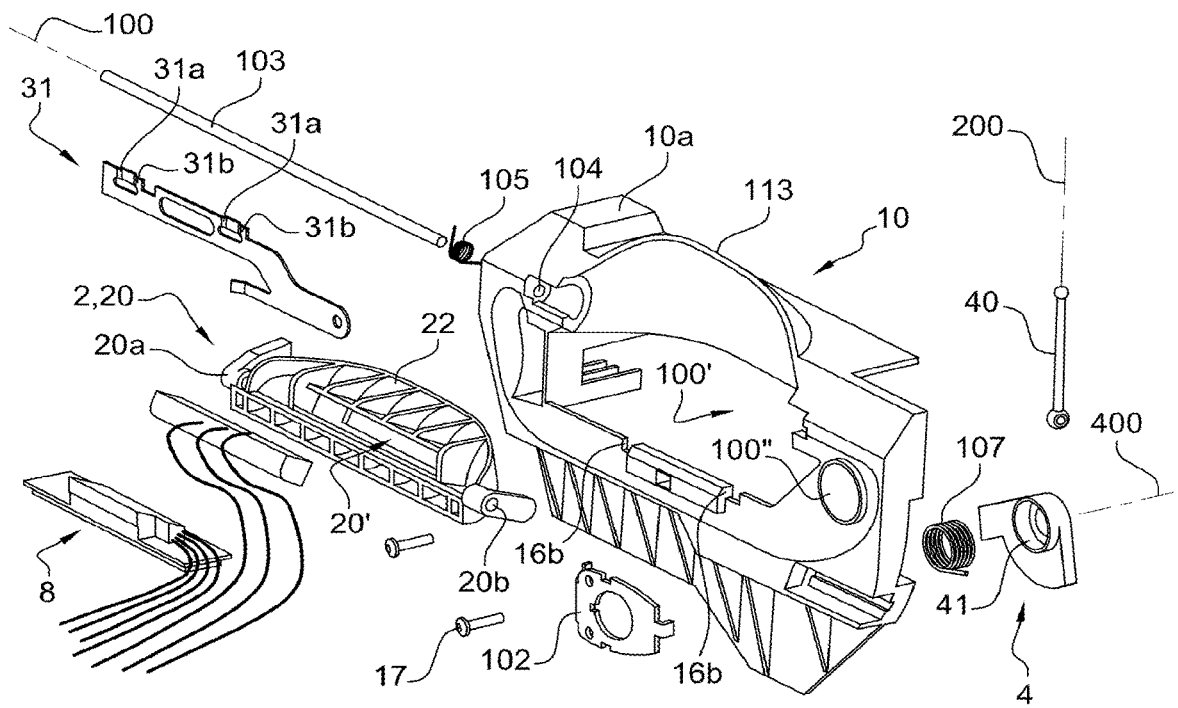
Fig. 5
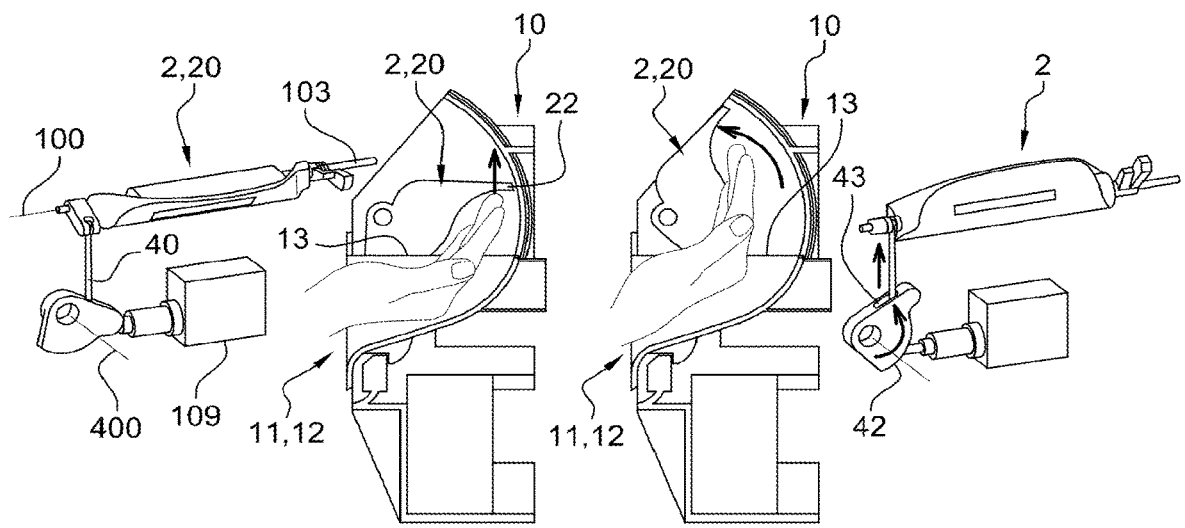
Fig. 6A  Fig. 6B

DOOR LEAF HANDLE DEVICE, IN PARTICULAR FOR VEHICLE

CROSS-REFERENCE TO RELATED APPLICATIONS

This application is a continuation of International Application No. PCT/EP2019/063513, filed on May 24, 2019, which claims priority to and the benefit of FR 18/54459, filed on May 25, 2018. The disclosures of the above applications are incorporated herein by reference.

FIELD

The present disclosure relates to handle devices for door leafs, in particular of motor vehicles, and more specifically flush type handle devices.

BACKGROUND

The statements in this section merely provide background information related to the present disclosure and may not constitute prior art.

A "flush" type handle device is characterized in that the movable handle, in particular translational and/or pivoting handle, is flush with the door leaf in a rest position. Such a handle device allows in particular improving the external aesthetic appearance, and where appropriate the aerodynamics, of a motor vehicle.

By way of example, the document WO 2014/049026 A1 is known in particular, which describes a handle flush with the bodywork, which includes a window forming a frame fastened to the door and provided to receive a lever for gripping by a user. The lever pivots relative to the frame between a rest position, in which the lever is flush with the frame, and an active position in which a portion of the lever protrudes from the frame. A handle device generally includes an electric motor controlling the displacement of the lever in its rest position or in its active position.

Such a device typically requires a complex arrangement of mechanical and electric elements in order to allow for guiding the lever in its rest position or in its active position.

In addition, the handle device of WO 2014/049026 A1 has the drawback of prematurely degrading these mechanical elements due to the exposure to weathering of the handle.

Moreover, according to the configuration of the handle device, the mounting of such a device is made difficult by the two-part assembly on the door leaf of the vehicle, namely a first part including the handle assembled from the outside of the door leaf and a second part including a handle support assembled from inside the door leaf.

SUMMARY

This section provides a general summary of the disclosure and is not a comprehensive disclosure of its full scope or all of its features.

The present disclosure aims at overcoming at least one of the aforementioned drawbacks of typical flush type handle devices by providing a simplified handle device allowing for protecting the handle from weathering.

To this end, the present disclosure relates to a door leaf handle device, in particular for a motor vehicle, including:
  a handle support mounted from inside the door leaf and,
  a window mounted from the outside of the door leaf,
  the window being fastened to the handle support from a clearance of the door leaf.

According to one form, the handle support includes the handle, and the window extends through a guide inwardly of the door leaf which includes an opening to allow access by one hand to the handle.

The window and the handle support are advantageously secured to each other, such that there is no relative movement to each other. Unlike the window, the handle is movable relative to the handle support. The window forms a cover which is fixedly mounted on the door leaf to allow for visually hiding the handle. The window then allows for protecting the handle while ensuring its access. In order to access the handle, the user inserts a hand into the window. The guide of the window, which is bowl-shaped, allows guiding the user's hand through the opening of the window for access to the handle. When the handle device is actuated, the handle is engaged inside the door leaf. Thus, the handle can be actuated by the user in a natural opening movement without being visible to the user. Unlike typical flush type handle devices, the handle is included inside the door leaf.

Moreover, such a device advantageously allows simplifying the assembly and the mechanical and electric elements which are generally provided for "flush" handles.

According to one form, the opening is formed on an upper wall of the guide of the window.

Such an arrangement of the opening allows, on the one hand, accompanying the hand of the user in a rocking movement from bottom to top to allow the grip of the handle in order to allow for the opening of the door leaf and, on the other hand, protecting the handle and the different constituent elements of the handle device from weathering.

The handle device, in accordance with the teachings of the present disclosure, may advantageously include at least one of the improvements below, the technical features forming these improvements can be taken alone or in combination:
  the handle is formed by a movable flap,
  the movable flap is guided in rotation about a horizontal axis,
  the movable flap allows actuating a lever via an actuating element oriented along a vertical axis,
  the movable flap carries an electric control element which is accessible by hand,
  the window includes a rear portion provided to receive, in correspondence, a case of a monitoring unit,
  the monitoring unit is a printed circuit board engaged between the rear portion of the window and the case of the printed circuit board,
  the handle device includes an element for detecting the presence of the hand in a detection zone facing the opening of the window,
  the detection element is a capacitive sensor which is electrically connected to the monitoring unit and disposed on a lower wall opposite to the upper wall facing the opening,
  the window includes a front face from which the guide thereof extends and in that the monitoring unit is electrically connected to a radiofrequency antenna, the antenna taking the shape of the window from the monitoring unit to one face opposite to the front face,
  the window includes retaining elements provided to be engaged with complementary retaining elements of the handle support,
  the handle device includes a light emitting element carried by the movable flap to be disposed facing the opening.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is an exploded view of the handle support of the handle device of FIG. 1, the handle support carrying the handle formed by a movable flap in accordance with the teachings of the present disclosure;

FIGS. 6A and 6B are sectional views of the handle device of FIG. 1, illustrating the movement of a hand of a user to allow for opening the door leaf;

Figure 1:
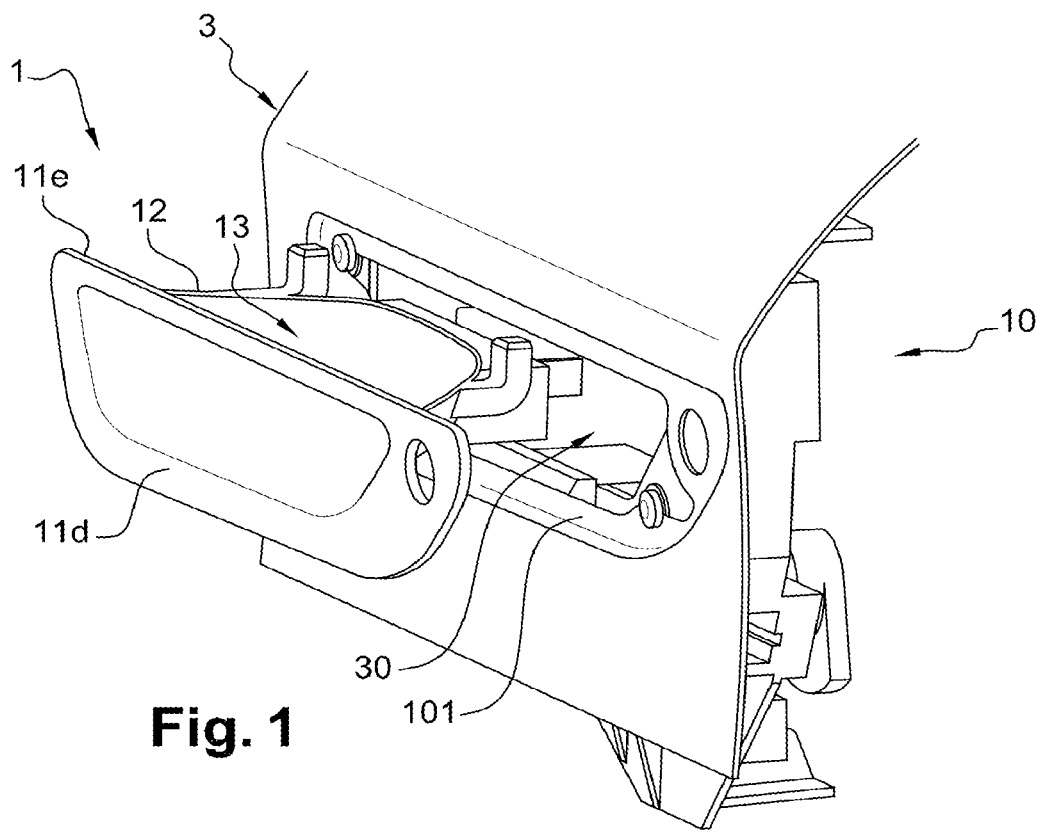
FIG. 1 is a perspective view of a handle device according to the teachings of the present disclosure, the handle device formed of a handle support and a window mounted on a door leaf.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
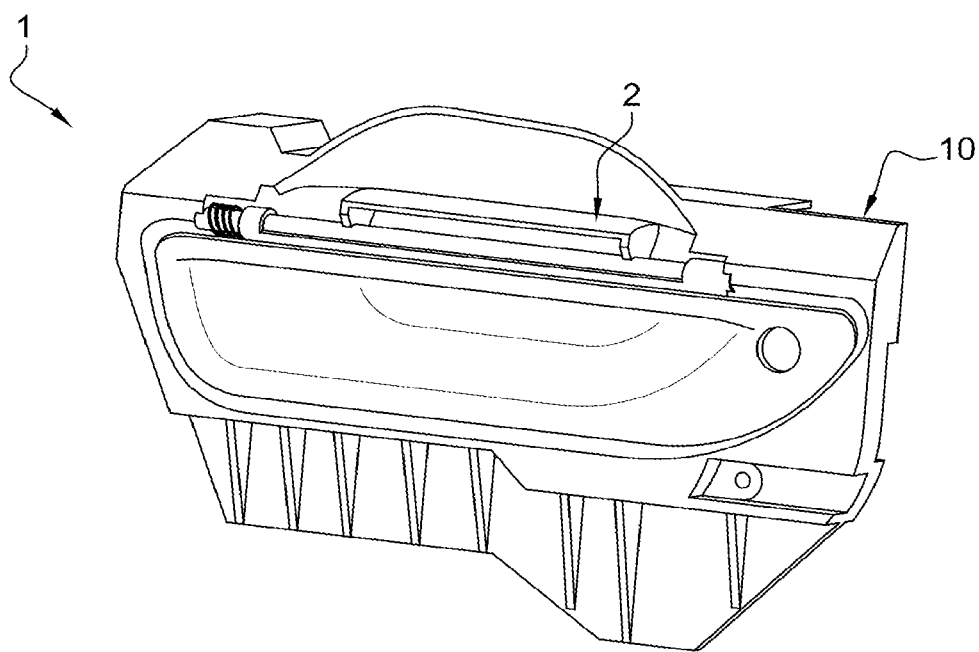
FIG. 2 is a different perspective view of the handle device of FIG. 1, illustrated without the door leaf.

In FIG. 1, a device 1 of a handle 2 (labeled in FIG. 2) is represented according to one example. The device 1 of the handle 2 is two-part assembled facing a clearance 30 of a door leaf 3, herein represented by a bodywork panel. A first part, mounted from inside the door leaf 3, is formed of a support 10 of the handle 2 of the device 1 carrying the handle 2. The inside of the door leaf is defined as being the portion corresponding to the passenger compartment of the vehicle as opposed to the outside of the door leaf. The handle 2 is movably mounted relative to the support 10 of the handle 2. A second part mounted from the outside of the sash 3 is formed of a window 11.

The window 11 includes a front face 11d, which may be flat, from which a guide 12 extends inwardly of the door leaf 3. The guide 12 advantageously takes the shape of a bowl and includes an opening 13 formed on an upper wall 11a of the guide 12. The opening 13 is sized to allow the passage of a hand.

In a first assembly step, the support 10 of handle 2 carrying the handle 2 is fastened on the door leaf 3 using a series of fastening screws 17 (FIG. 5) in correspondence of holes and bores, respectively of the door leaf 3 and of the support 10 of the handle 2. In a second assembly step represented in FIG. 2, the window 11 is inserted into the clearance 30 of the door leaf 3 to extend inwardly of the latter. In the assembled state, the handle 2 is facing the opening 13 of the guide 12 of the window 11 thus allowing the access by one hand from the window 11 to reach the handle 2, as represented in FIGS. 6a and 6b.

Figure 3:
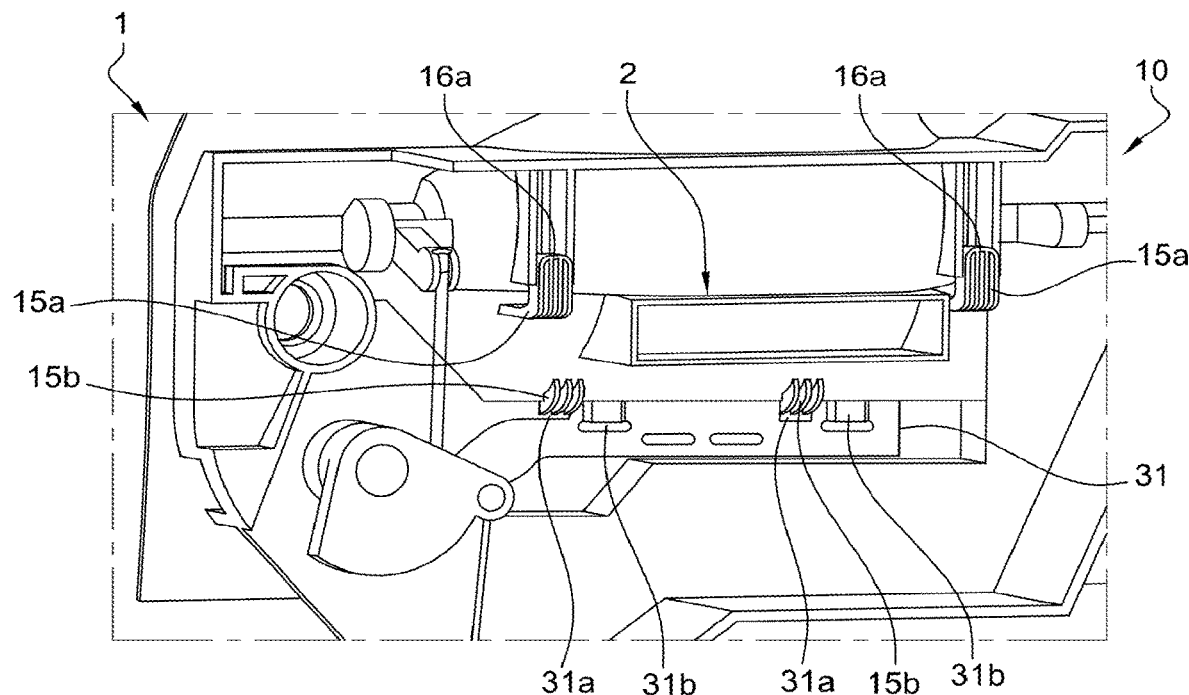
FIG. 3 is a rear view of the handle device of FIG. 2.
Figure 4:
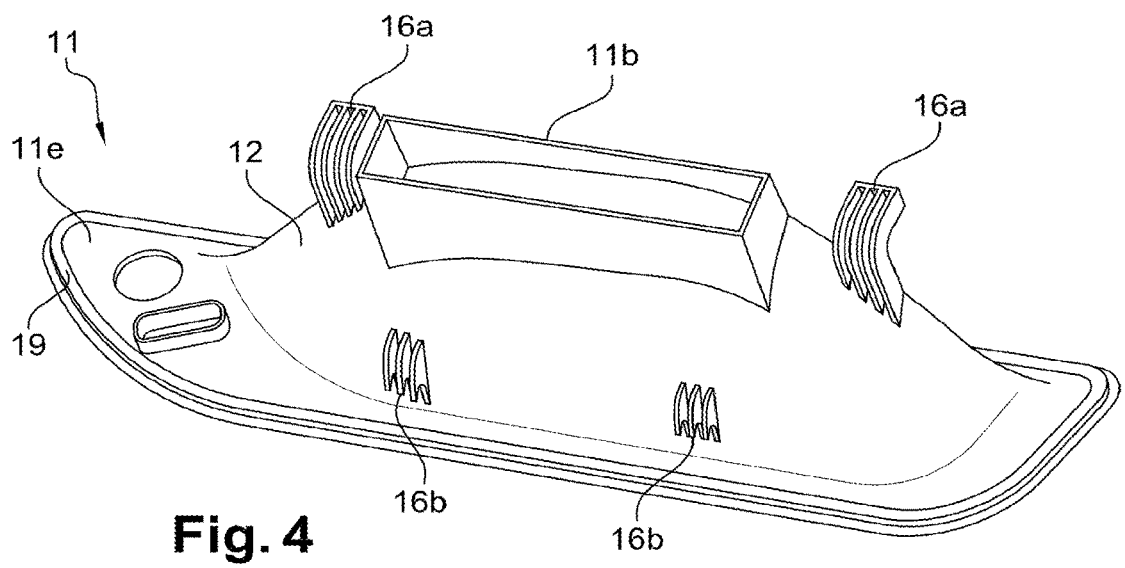
FIG. 4 is a perspective view of the rear of the window of the handle device of FIG. 1.

With reference to FIGS. 3 and 4, the window 11 carries retaining elements 15a, 15b provided to be engaged with complementary retaining elements 16a, 16b of the support 10 of the handle 2. More particularly, first retaining elements 15a, 16a are formed by upper fingers 15a configured to be engaged in slots 16a formed on the support 10 of the handle 2 in order to hold the window 11 on the support 10 of the handle 2 in a predetermined position. This predetermined position allows positioning the opening 13 facing the handle 2. Second retaining elements 15b, 16b are formed by lower fingers 15b configured to be inserted into notches 16b (FIG. 5) of the support 10. A reinforcing plate 31 is advantageously provided to be applied on the support 10 of the handle 2 from inside the door leaf 3. The reinforcing plate 31 includes successive housings 31a with notches 31b. Once the plate 31 is disposed on the support 10, the second retaining elements 15b of the window 11 protrude from the notches 31b of the reinforcing plate 31. The reinforcing plate 31 is then pulled (by being pressed on the support 10 so as to match the housings 31a of the reinforcing plate 31 and the second retaining elements 15b of the window 11. The reinforcing plate 31 then allows a tight mounting of the window 11 on the support 10 of the handle 2.

With reference to FIGS. 1 and 4, a seal 19 is provided to be disposed between the window 11 and the support 10 of the handle 2. More particularly, the seal 19 is provided to follow the contour of a face 11e of the window 11 opposite to the front face 11d and a receiving portion 101 of the support 10 of the handle 2 receiving the opposite face 11e. The seal 19 then ensures the sealing between the window 11 and support 10.

Figure 10:
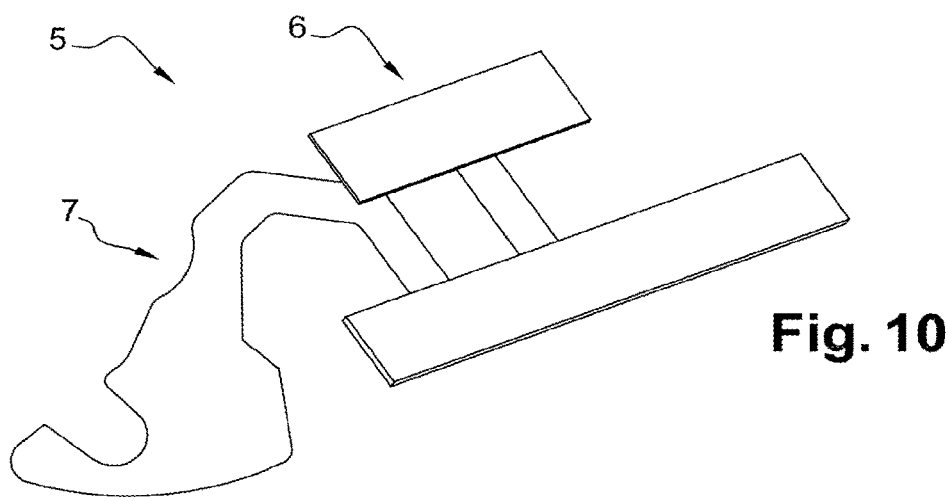
FIG. 10 is a perspective view of a monitoring unit which is electrically connected to a radiofrequency antenna and an element for detecting the presence of a hand in the window in accordance with the teachings of the present disclosure.

In FIG. 4, the guide 12 of the window 11 including a rear portion 11b of a rectangular shape provided to support a monitoring unit 5 illustrated in FIG. 10. The rear portion 11b of the window 11 is represented open, but includes, preferably, a cap closing its access. Alternatively, the rear portion 11b is closed by the making the window 11 in one piece.

In FIG. 5, the support 10 of handle 2 of the device 1 of handle 2 is represented in more detail. The support 10 of the handle 2 is formed of a body 10a including a passage 100' provided for the insertion of the window 11 and an assembly hole 100" of a lock mechanism assembled using a fastening plate 102. The support 10 of the handle 2 is provided to receive the handle 2 of the device 1 such that the handle 2 is fully carried by the support 10 thereof. When the device 1 of the handle 2 is actuated, the handle 2 is engaged inside the door leaf 3. In a non-limiting manner, the handle 2 is formed by a movable flap 20 including a tab 22. The tab 22 of the handle 2 extends inwardly of the door leaf 3. The movable flap 20 is pivotally mounted on the support 10 of the handle 2. The pivoting is ensured by a longitudinal rod 103 hinged by the ends thereof on the support 10. A domed upper portion 113 of the support 10 allows the mobility of the flap 20.

In order to facilitate the understanding of the examples provided, the terms "horizontal," "vertical," and "transverse," as used herein, are to be interpreted as relating respectively to the references "100," "200," and "400" as represented in FIG. 5.

Figure 8:
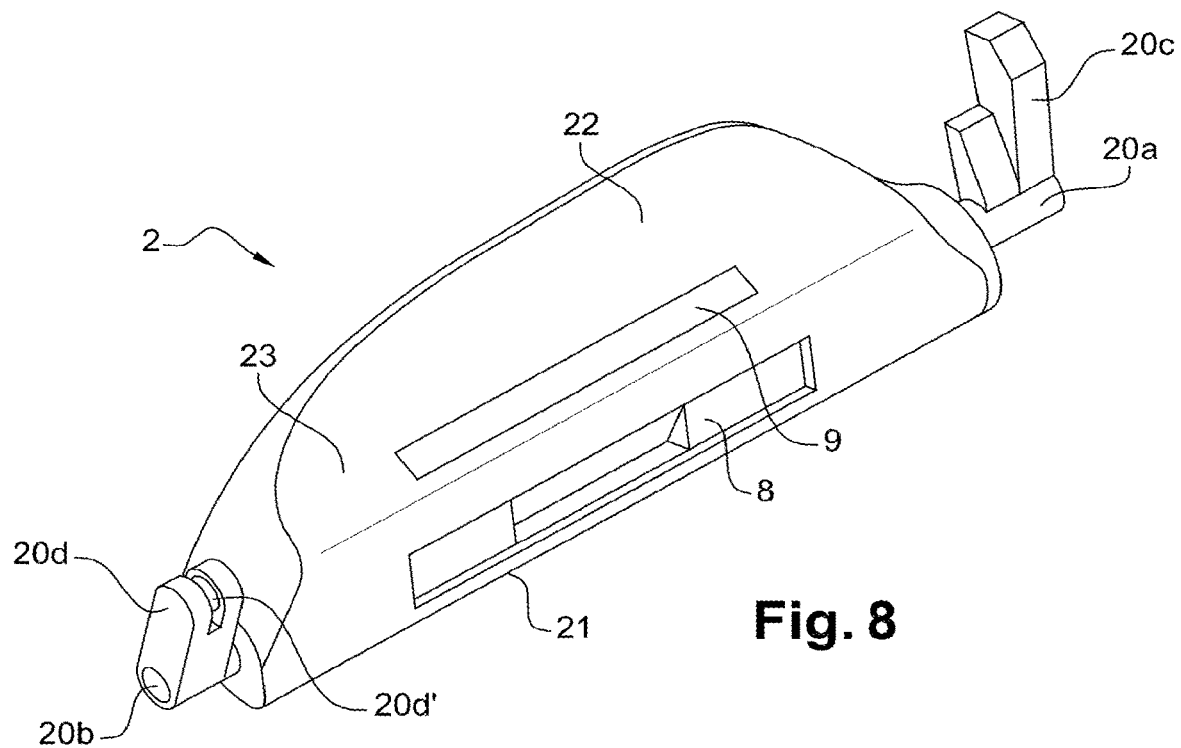
FIG. 8 is a perspective view of a portion of the handle device of FIG. 1, illustrating the handle device equipped with an electric control element in accordance with the teachings of the present disclosure.

With reference to FIGS. 5 and 8 together, the movable flap 20 includes, at the ends thereof, tubular protrusions 20a, 20b which extend longitudinally. The rod 103 is provided to pass through the tubular protrusions 20a, 20b of the movable flap 20. The ends of the rod 103 are then received in cylindrical guides 104 of the support 10 of the handle 2 and the tubular protrusions 20a, 20b are received in correspondence on the support 10. The rod 103 then guides the movable flap 20 in rotation about a horizontal axis 100.

The rod 103 carries a helical spring 105 with angular action allowing the return of the movable flap 20 towards its rest position. For this, the spring 105 bears by one end on the support 10 and by another end on the movable flap 20.

One of the tubular protrusions 20a of the movable flap 20 includes a blocking arm 20c. The blocking arm 20c extends perpendicularly to a longitudinal direction of the tubular protrusion 20a to which it is associated. The blocking arm 20c allows the abutment of the movable flap 20 in an end-of-travel position of the movable flap 20. Thus, in this end-of-travel position, the blocking arm 20c abuts against the support 10 and blocks in rotation the movable flap 20.

The other tubular protrusion 20b of the movable flap 20 includes a control arm 20d. The control arm 20d also extends perpendicularly to a longitudinal direction of the tubular protrusion 20b to which it is associated. The control arm 20d allows the actuation of a lever 4 via an actuating element 40, called first actuating element 40. The actuating element 40 is preferably oriented along a vertical axis 200. This actuating element 40 is herein formed by a longitudinal bar carrying, at each of the ends thereof, a ball joint.

Figure 6C:
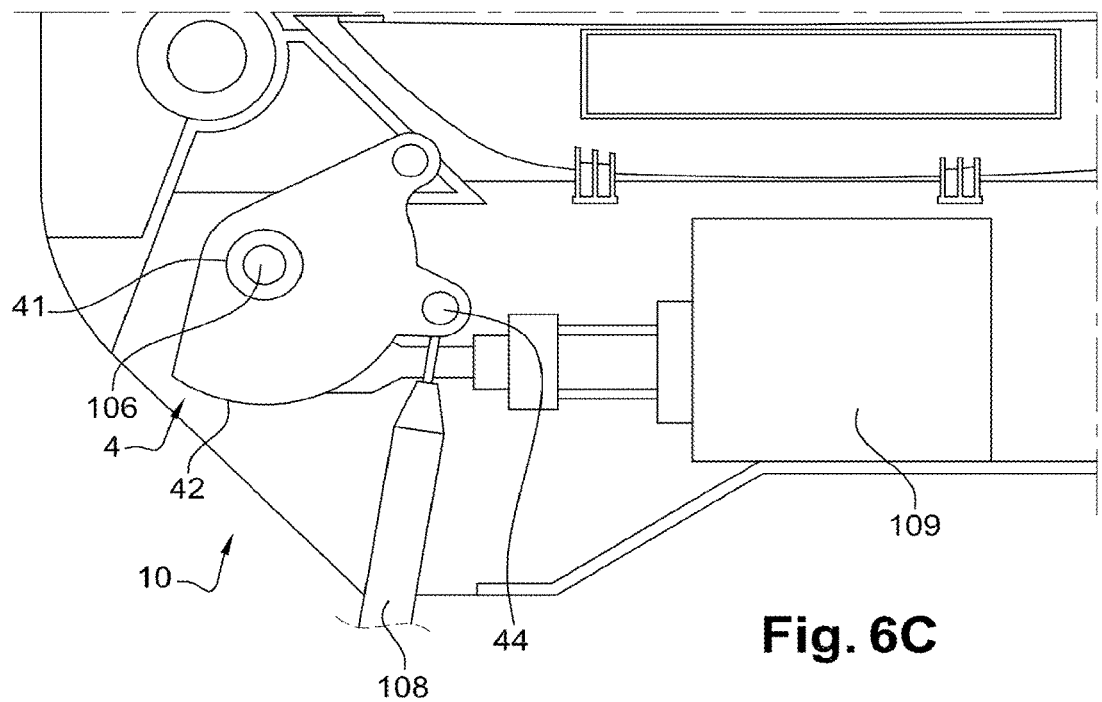
FIG. 6C is an enlarged view of the rear portion of the handle support of FIG. 1, illustrating the movement of the lever when the movable flap is actuated.

The lever 4 includes an annular connecting element 41 provided to be mounted on a lug 106 for fastening the support 10 of the handle 2 as represented in FIG. 6C. The connecting element 41 allows guiding in rotation the lever 4. The lever 4 extends radially from the annular connecting element 41 through an angular portion 42. A linear perforation 43 (represented in FIG. 6B) formed in the angular portion 42 allows guiding the stroke of the longitudinal bar.

The annular connection 41 of the lever 4 carries a helical spring 107 with angular action allowing guiding the lever 4 towards a position corresponding to the rest position of the movable flap 20.

The lever 4 is guided by the annular connecting element 41 about a transverse axis 400. The transverse axis 400 is perpendicular to each of the horizontal 100 and vertical 200 axes.

One end of the actuating element 40 is inserted into the angular portion 42 of the lever 4 to emerge from the linear perforation 43. The inserted end of the actuating element 40 then fits into a slot 20d' formed at the end of the control arm 20d, such that the emerging end allows its retention in at least one direction. The opposite end of the actuating element 40 is fitted into the angular portion 42 with a portion complementary to the ball joint associated to this end to form a ball-joint connection.

The actuating element 40 can thus be maneuvered without mechanically stressing the movable flap 20 and the lever 4.

Moreover, an electric control element 9 and a light emitting element 8 carried by the movable flap 20 are represented, which will be described in more detail later.

In FIGS. 6A and 6B, a first mode of opening of the door leaf 3 is represented. This first opening mode is carried out mechanically using the movable flap 20. FIG. 6A represents the movable flap 20 in a rest position, while FIG. 6B represents the movable flap 20 in an active position. When a hand is inserted into the window 11, the bowl shape of the window 11 guides 12 the hand towards the opening 13 of the top wall 11a. The hand then passes through the opening 13 to search for the tab 22 of the movable flap 20 by the fingertips of the hand. The pressing of the fingers of the hand on the tab 22 accompanying the movement of the hand causes the movable flap 20 to pivot about the horizontal axis 100 using the rod 103 provided for this purpose. The movable flap 20 is then pushed inside the door leaf 3. The actuating element 40 connected to the control arm 20d of the movable flap 20 then actuates the lever 4 which is driven in rotation about its transverse axis 400.

In FIG. 6C, the lever 4 has been represented in more detail. The lever 4 carries, on its angular portion 42, a hook 44 configured to receive the end of a flexible control cable 108, also called "Bowden cable." The opposite end of the control cable 108 allows unlocking a rabbeted trigger of the door leaf 3 for the opening 13 thereof.

The blocking arm 20c and the control arm 20d are advantageously radially offset from each other. This radial offset of the arms 20c, 20d allows monitoring the angular movement of the lever 4 such that the stroke of the control cable 108 is advantageously monitored to allow a maximum displacement of the flexible control cable of 29 mm.

FIG. 6C also represents an electric actuator 109 configured to electrically actuate the lever 4 as will be described later.

This first mechanical opening mode advantageously allows not biasing the electric actuator 109. It can therefore be a fallback solution, in the case where the actuator is defective.

Figures 7A, 7B:
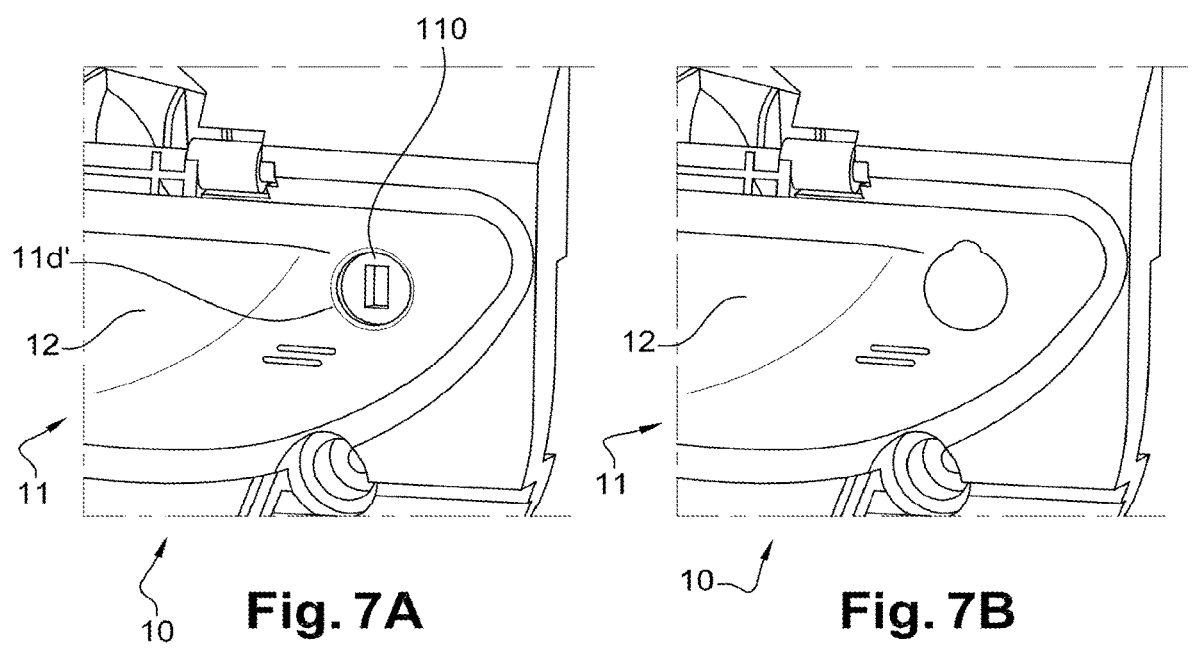
FIGS. 7A to 7D are different enlarged views of the rear portion of the handle support of FIG. 1, illustrating the mounting of a lock mechanism on the handle support in accordance with the teachings of the present disclosure.

In FIGS. 7A and 7B, an enlargement of a front portion of the support 10 of the handle 2, equipped with the lock mechanism 110, is represented. The front face 11d of the window 11 includes a hole 11d' for access to the lock mechanism 110 via the hole 100" of the support 10. A cover may advantageously be provided to hide the access to the lock mechanism 110 when the latter is not used. This cover can, for example, take a rounded shape following the shape of the hole 11d' of the window 11 and is pivotally mounted on the window 11 by a protruding portion.

Figure 7C:
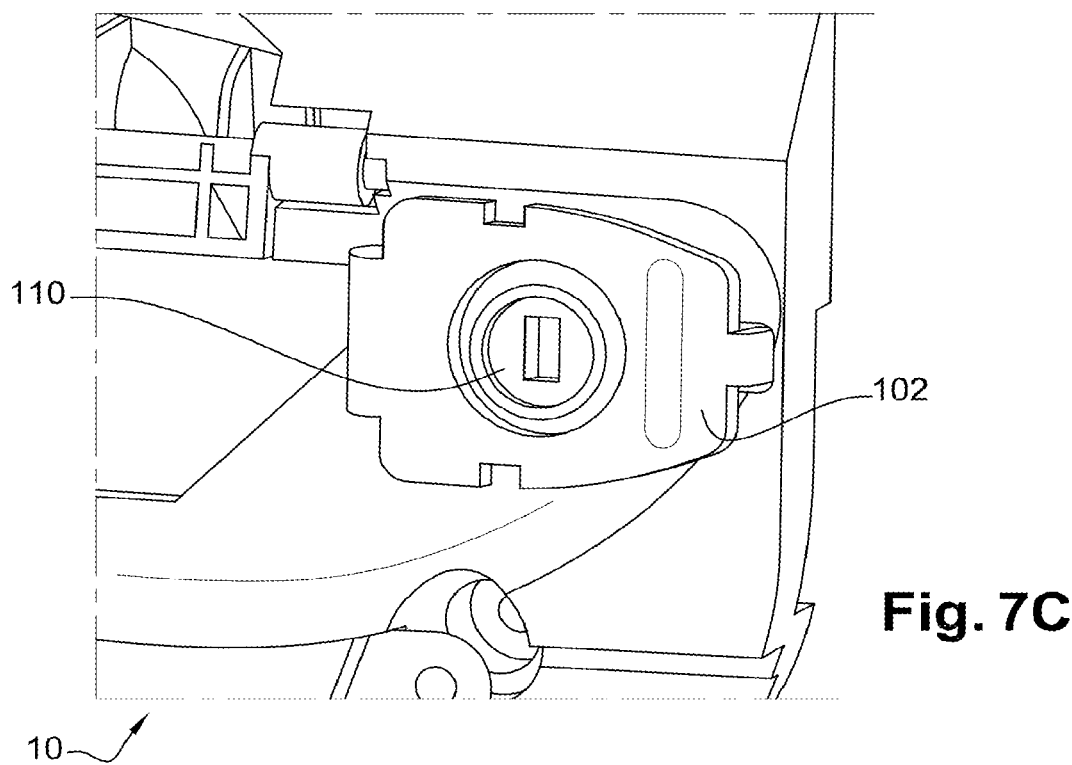
Figure 7D:
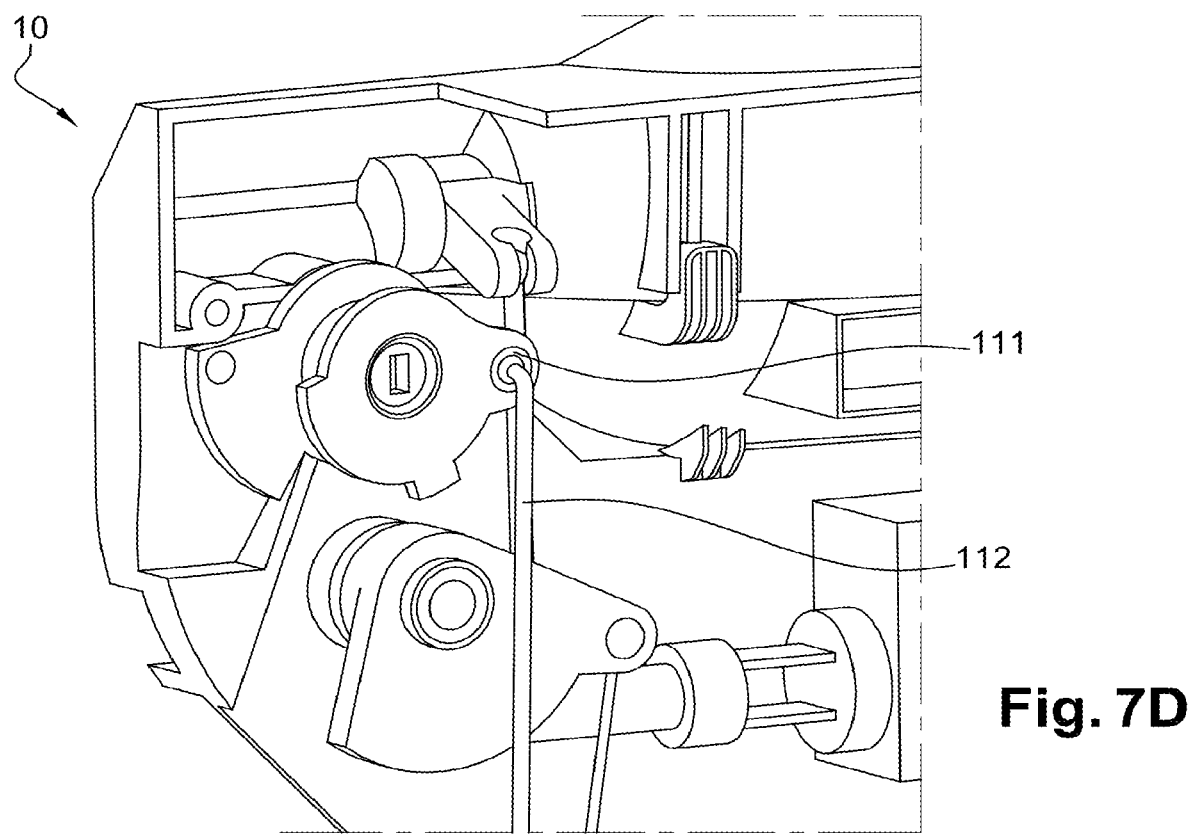

In FIGS. 7C and 7D, there is shown an enlargement of a rear portion of the support 10 of the handle 2, which is represented in FIG. 7B. The lock mechanism 110 is assembled on the support 10 of the handle 2 using the fastening plate 102, this plate 102 serves as protection by blocking the access to the downstream mechanism of the lock behind the plate. Furthermore, the lock of the mechanism 110 includes an unlocking arm 111 connected to an actuating element 112, called second actuating element 112. This actuating element 112 is formed by a longitudinal bar connecting the unlocking arm 111 of the lock mechanism 110 to a rabbeted latch of the door leaf 3 for unlocking it.

In FIG. 8, a more detailed view of the handle 2, formed by the movable flap 20, is represented. The movable flap 20 includes a central portion 21 from which the tab 22 extends and which extends laterally through the tubular protrusions 20a, 20b. The central portion 21 and the tab 22 of the movable flap 20 are delimited by a curved zone 23 which includes the electric control element 9 which is mounted on the movable flap 20 from a passage 20' formed on the latter, as represented in FIG. 5. The electric control element 9 herein takes the shape of an electrical switch. This electric control element 9 allows actuating the electric actuator 109 of the lever 4. The curved zone 23 of the movable flap 20 advantageously allows gripping the movable flap 20 by the hand in order to be pulled towards the user. The advantageous arrangement of the electric control element 9 on the curved zone 23 of the movable flap 9 thus allows facilitating the movement for opening the door leaf 3 by the user.

A second mode of opening of the door leaf 3 will be described below. This second opening mode is carried out electrically using the electric control element 9.

The electric opening of the door leaf 3 is carried out as follows. When a user inserts his hand into the window 11 and accesses, through the opening 13 of the window 11 provided for this purpose, the movable flap 20, the user first presses the electric control element 9, with the fingers of his hand, by bringing his hand towards himself, thus controlling the unlocking of the trigger of the door leaf 3. Then, once the electric control element 9 has been pressed, the user's fingers come to press the curved portion in order to pull the handle 2 towards the user and open the door leaf 3.

The control of the actuator 109 by the electric control element 9 is carried out via the monitoring unit 5 which will be described in more detail later.

Figure 9:
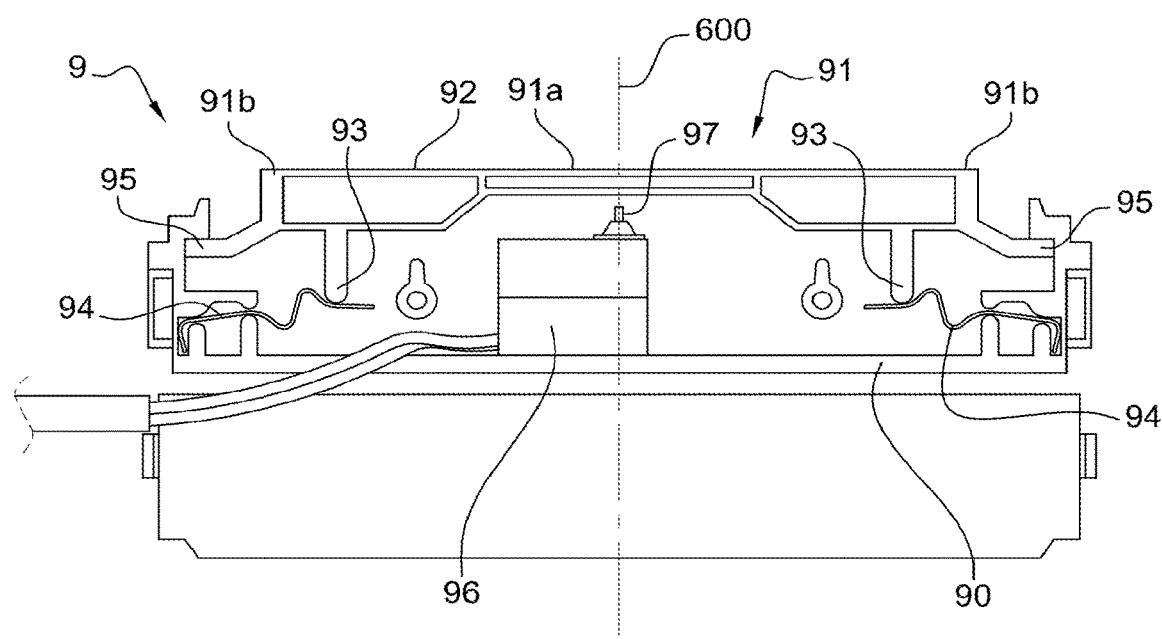
FIG. 9 is an example of the electric control element of FIG. 8 in accordance with the teachings of the present disclosure.

In FIG. 9, one particular example of the electric control element 9 is represented. The electric control element 9 includes a body 90 on which a hand lever 91 is movably mounted. The body 90 is fixed relative to the support 10. A face 92 of the hand lever 91 accessible by the user is in rectilinear in shape. The hand lever 91 extends inside the body 90 by two legs 93, each bearing on a spring element 94. The legs 93 of the hand lever 91 and the spring elements 94 are advantageously disposed in symmetry relative to each other along an axis 600 passing through the center of the hand lever 91. Guide arms 95 of the hand lever 91 extend laterally therefrom to bear against the body 90 of the electric control element 9. A micro-switch 96 is placed opposite to a central portion 91a of the hand lever 91. The micro-switch 96 includes a push rod 97 in contact with the central portion 91a of the hand lever. Advantageously, the push rod 97 is disposed such that it intersects the axis of symmetry 600 of the hand lever 91.

When the electric control element 9 is actuated by the hand of a user, this particular mode of the electric control element 9 allows the micro-switch 96 to be triggered by the push rod 97 thereof regardless of the pressure of the user's hand on the central portion 91a of the hand lever 91 or else on the ends 91b of the hand lever 91.

Figure 11:
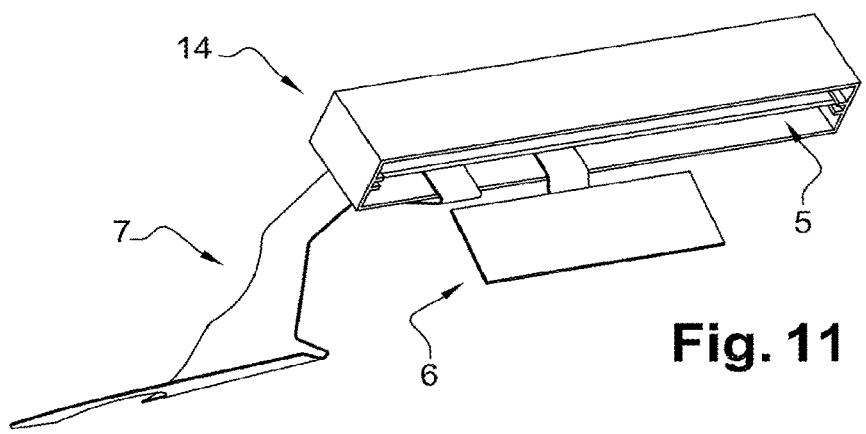
FIG. 11 is a perspective view of a case of the monitoring unit of FIG. 10 equipped with the latter in accordance with the teachings of the present disclosure.
Figure 12:
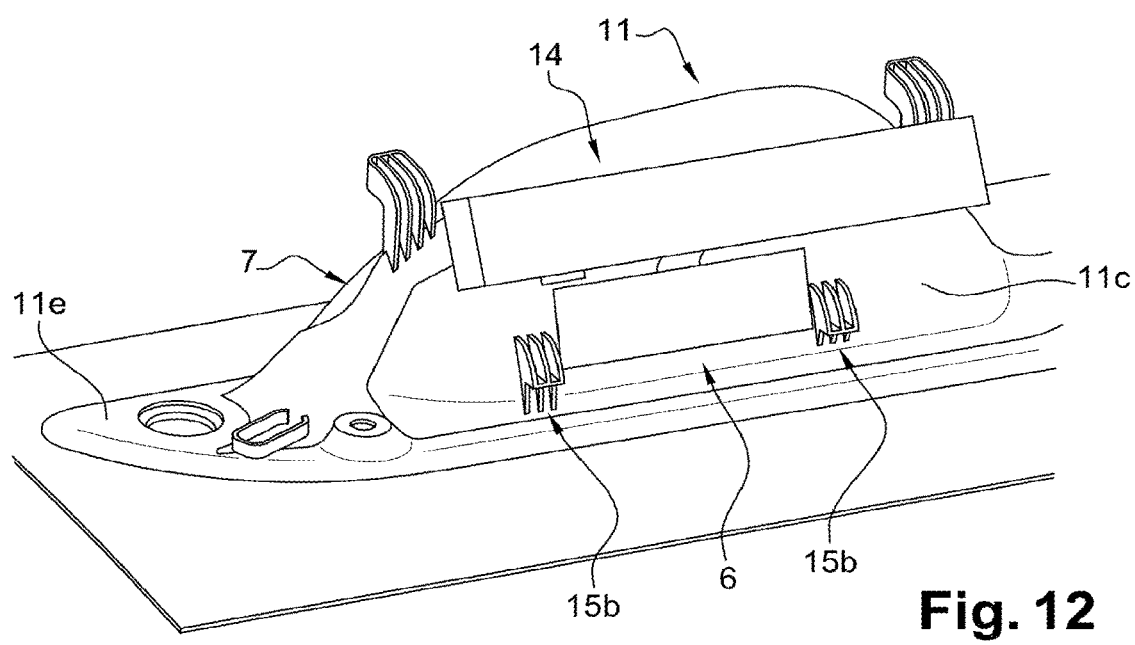
FIG. 12 is a perspective view of the handle device of FIG. 1 equipped with the monitoring unit of FIG. 10 and the case thereof in accordance with the teachings of the present disclosure.

In FIGS. 10 to 12, the monitoring unit 5 is represented. Even if this is not represented, the monitoring unit 5 is electrically connected to the electric control element 9 as well as to the electric actuator 109.

The monitoring unit 5 takes the form of a printed circuit board, and, in one example, is rectangular in shape. The monitoring unit 5 is also electrically connected to an element 6 for detecting the presence of a hand in the window 11. A case 14 is provided to receive the monitoring unit 5. By way of example, the detection element 6 can be a capacitive sensor and it can have a flat shape. This case 14 is advantageously formed of a rectangular envelope provided to be carried by the rear portion 11b of the window 11. The case 14 is then disposed on a contour of the rear portion 11b of the window 11 of a matching shape. The monitoring unit 5 is then taken between the case 14 and the rear portion 11b of the window 11. In the assembled state of the monitoring unit 5, the detection element 6 extends over a lower wall 11c of the guide 12 and is advantageously housed between the second retaining elements 15b of the window 11 to ensure the holding thereof. The detection element 6 is then facing the opening 13 of the window 11.

The detection element 6 allows a third mode of opening of the leaf 3. In this case, when the user's hand is inserted into the window 11 and arrives facing the opening 13 thereof, the detection element 6 identifies the presence of the hand, for example in the case of a capacitive sensor by a disturbance of the magnetic field emitted by the sensor due to the presence of the hand.

A radiofrequency antenna 7 is also represented in FIGS. 10 to 12. This antenna 7 is advantageously flexible to take the shape of the window 11. It extends from the monitoring unit 5, to which it is connected, to the face 11e which is opposite to the front face 11d of the window 11 to allow the reception of signals. Such an antenna 7 allows a fourth mode of opening of the door leaf 3 in which, when the user remotely controls the opening 13 of the door leaf 3 by a remote control, a radiofrequency signal received by the antenna is transformed into a electrical signal sent to the monitoring unit 5. The monitoring unit 5 then electrically controls the electric actuator 109 driving the lever 4.

Figure 13:
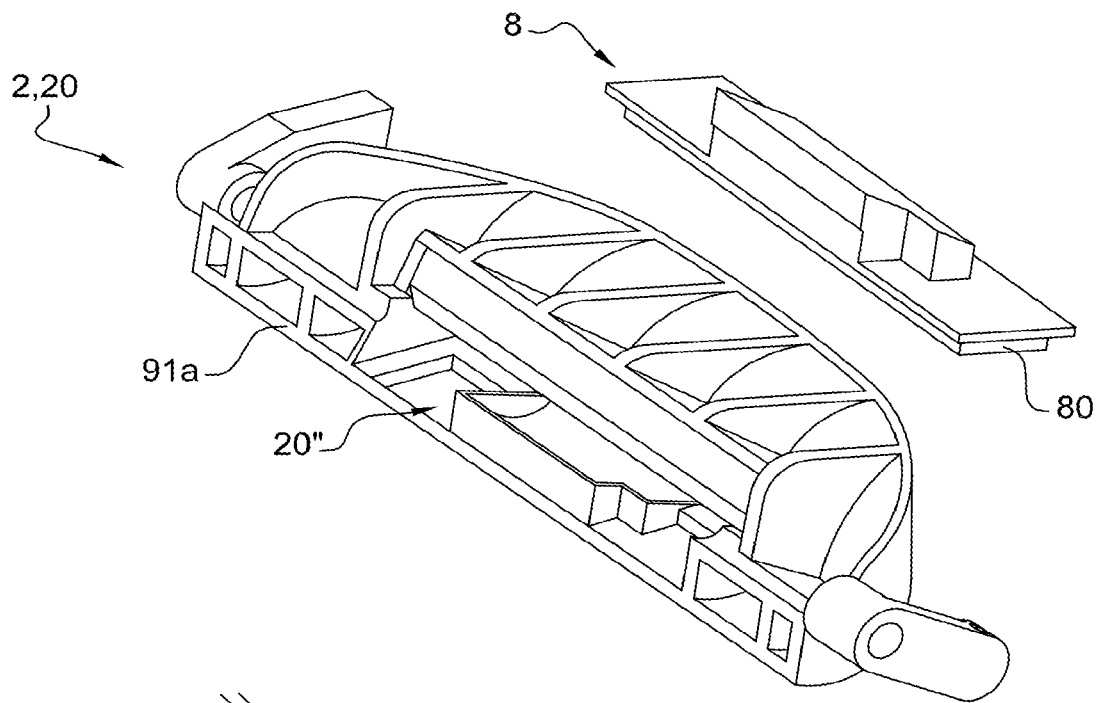
FIG. 13 is a perspective view of the movable flap of FIG. 5, equipped with a light emitting element in accordance with the teachings of the present disclosure.
Figure 14:
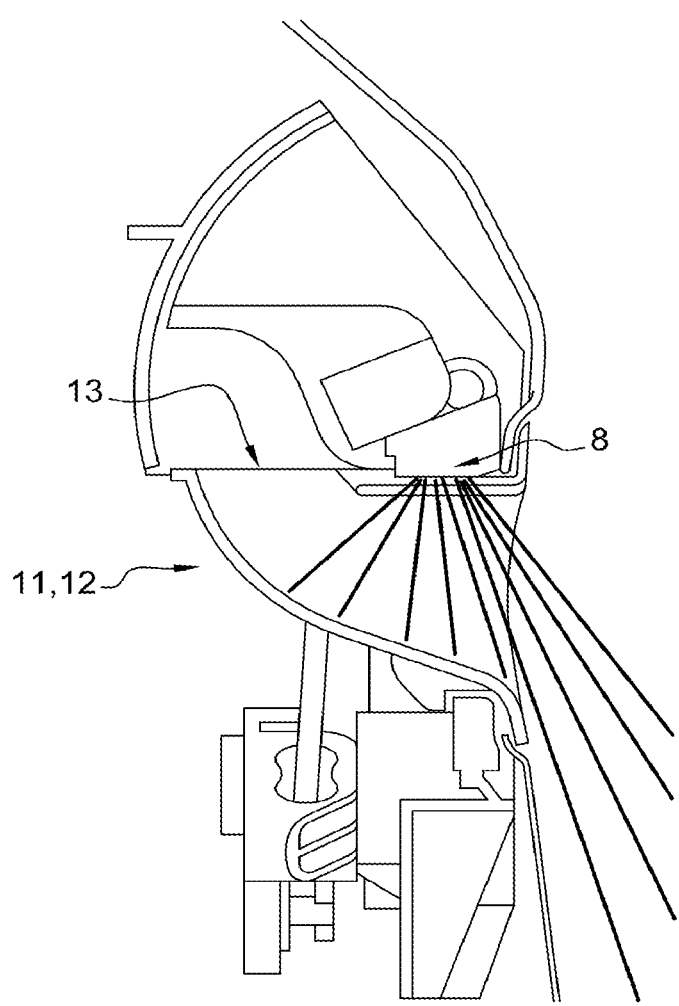
FIG. 14 is a sectional view similar to FIGS. 6A and 6B, illustrating the operation of the light emitting element of FIG. 13.

In FIGS. 13 and 14, the movable flap 20, on which a light emitting element 8 is mounted, is represented. The light emitting element 8 is formed by light sources directed towards a light projection guide 80. A cutout 20" is provided on the central portion 91a of the movable flap 20 to receive the light emitting element 8. In the assembled state, the light emitting element 8 is carried by the movable flap 20 facing the opening 13 of the window 11.

The light emitting element 8 is electrically connected to the monitoring unit 5. In practice, the light emitting element 8 emits light rays towards the opening 13 of the window 11. These light rays are advantageously reflected by the bowl shape of the guide 12 of the window 11 and emitted to the outside of the door leaf 3. Such a light emitting element 8 can provide the user with an indication on the open or closed state of the door leaf 3. For example, when the user carries out one of the preceding opening modes, the light emitting element 8 emits a green light. On the contrary, when a closing command is received, the light emitting element 8 emits a red light.

The teachings of the present disclosure are not limited to the examples which have just been described and numerous adjustments can be made to these examples without departing from the scope of the disclosure. In particular, the different features, forms, examples, and variants of the disclosure can be associated with each other according to various combinations as long as they are not incompatible or exclusive of each other. In particular, all previously described variants, examples, and forms can be combined with each other.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A handle device of a door leaf, in particular for a motor vehicle, the handle device comprising:
    a handle support mounted from inside the door leaf and including a handle; and
    a window mounted from outside of the door leaf, the window being fastened to the handle support from a clearance of the door leaf, and the window extending through a guide inwardly of the door leaf which includes an opening to allow access by a hand to the handle,
    wherein the window comprises retaining elements provided to be engaged with complementary retaining elements of the handle support;
    wherein the retaining elements include a first retaining element and a second retaining element, and the complementary retaining elements include slots and notches; and
    wherein said first retaining element is formed by an upper finger, said first retaining element being configured to engage a slot of the handle support; the second retaining element is formed by a lower finger, the second retaining element being configured to be inserted into a notch of the handle support in order to keep the window in a predetermined position on the handle support;
    wherein the handle is formed by a movable flap, the movable flap being guided in rotation about a horizontal axis, the movable flap including a tubular protrusion at an end, said tubular protrusion extending longitudinally according to the horizontal axis;
    wherein said tubular protrusion includes a control arm extending perpendicularly to a longitudinal direction of the tubular protrusion, the control arm allowing the actuation of a lever via an actuating element oriented along a vertical axis;
    wherein an end of the actuating element provided with a ball joint is inserted into an angular portion of the lever to emerge from a linear perforation of the lever;
    wherein an opposite end of the actuating element also provided with a ball joint fits into a slot formed at the end of the control arm.

2. The handle device according to claim 1, wherein the opening is formed on an upper wall of the guide of the window.

3. The handle device according to claim 1, wherein the movable flap carries an electric control element which is accessible by the hand.

4. The handle device according to claim 1, wherein the window comprises a rear portion configured to receive, in correspondence, a case of a monitoring unit.

5. The handle device according to claim 4, wherein the monitoring unit is a printed circuit board and engaged between the rear portion of the window and the case of the printed circuit board.

6. The handle device according to claim 4 further comprising an element for detecting the presence of the hand in a detection zone facing the opening of the window, wherein the detection element is a capacitive sensor which is electrically connected to the monitoring unit and disposed on a lower wall opposite to the upper wall facing the opening.

7. The handle device according to claim 4, wherein the window includes a front face from which the guide thereof extends and in that that the monitoring unit is electrically connected to a radiofrequency antenna, the antenna taking the shape of the window from the monitoring unit to one face opposite to the front face.

8. The handle device according to claim 1 further comprising an element for detecting the presence of the hand in a detection zone facing the opening of the window.

9. The handle device according to claim 1, wherein the handle device includes a light emitting element carried by the movable flap to be disposed facing the opening.

10. A handle device of a door leaf, in particular for a motor vehicle, the handle device comprising:
    a handle support mounted from inside the door leaf and including a handle; and
    a window mounted from outside of the door leaf, the window being fastened to the handle support from a clearance of the door leaf, and the window extending through a guide inwardly of the door leaf which includes an opening to allow access by a hand to the handle;
    wherein the handle is formed by a movable flap, the movable flap being guided in rotation about a horizontal axis, the movable flap including a tubular protrusion at an end, said tubular protrusion extending longitudinally according to the horizontal axis;
    wherein said tubular protrusion includes a control arm extending perpendicularly to a longitudinal direction of the tubular protrusion, the control arm allowing the actuation of a lever via an actuating element oriented along a vertical axis;
    wherein an end of the actuating element provided with a ball joint is inserted into an angular portion of the lever to emerge from a linear perforation of the lever;
    wherein an opposite end of the actuating element also provided with a ball joint fits into a slot formed at the end of the control arm.

* * * * *